US010421390B2

(12) United States Patent
Hara et al.

(10) Patent No.: US 10,421,390 B2
(45) Date of Patent: *Sep. 24, 2019

(54) LAMP DEVICE

(71) Applicant: KOITO MANUFACTURING CO., LTD., Tokyo (JP)

(72) Inventors: Hiroaki Hara, Shizuoka (JP); Kazuhito Osada, Shizuoka (JP); Nobuyuki Horikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,640

(22) Filed: Feb. 12, 2018

(65) Prior Publication Data

US 2018/0229645 A1 Aug. 16, 2018

(30) Foreign Application Priority Data

Feb. 10, 2017 (JP) ................. 2017-023184

(51) Int. Cl.
*B60Q 1/00* (2006.01)
*G01S 13/93* (2006.01)
*G01S 15/93* (2006.01)
*G01S 17/93* (2006.01)
*G01S 7/481* (2006.01)
*F21S 41/20* (2018.01)
*F21S 41/50* (2018.01)
*F21S 45/10* (2018.01)

(52) U.S. Cl.
CPC .......... *B60Q 1/0023* (2013.01); *F21S 41/285* (2018.01); *F21S 41/50* (2018.01); *F21S 45/10* (2018.01); *G01S 7/4813* (2013.01); *G01S 13/931* (2013.01); *G01S 15/931* (2013.01); *G01S 17/936* (2013.01); *G01S 2013/9396* (2013.01); *G01S 2015/937* (2013.01)

(58) Field of Classification Search
None
See application file for complete search history.

(56) References Cited

U.S. PATENT DOCUMENTS 7,276,854 B1 * 10/2007 Deutsch .................. B60R 11/00
315/77
2010/0328926 A1 * 12/2010 Hoelen .............. C09K 11/7774
362/84

FOREIGN PATENT DOCUMENTS

JP 2010185769 A 8/2010

* cited by examiner

*Primary Examiner* — Ashok Patel
(74) *Attorney, Agent, or Firm* — Osha Liang LLP

(57) ABSTRACT

A lamp device mounted on a vehicle includes a housing, a first translucent member defining a housing space together with the housing, a lamp unit housed in the housing space and including a light source, a sensor housed in the housing space and configured to detect information outside the vehicle based on invisible light, and a second translucent member housed in the housing space and covering the sensor. The second translucent member has transmittance of visible light lower than that of the first translucent member.

6 Claims, 4 Drawing Sheets

LAMP DEVICE

CROSS-REFERENCE TO RELATED APPLICATIONS

The present application claims the benefit of priority of Japanese Patent Application No. 2017-023184, filed on Feb. 10, 2017, the content of which is incorporated herein by reference.

TECHNICAL FIELD

The present invention relates to a lamp device to be mounted on a vehicle.

BACKGROUND ART

In order to achieve driving support of a vehicle, it is necessary to mount on a vehicle body a sensor for acquiring information outside the vehicle. There has been known a Light Detection and Ranging (LiDAR) sensor as one example of such a sensor (for example, see JP-A-2010-185769). The LiDAR sensor is a device for emitting invisible light and acquiring information on a distance to an object and an attribute of the object based on a reflected light.

From a viewpoint of efficiently acquiring information on surroundings of the vehicle and from a viewpoint of design, it is desired to dispose the sensor in a lamp room of the lamp device provided at four corners of the vehicle. However, since the sensor for acquiring information outside the vehicle based on invisible light generally has a relatively large volume, the sensor tends to be subject to layout restriction in the lamp room.

Accordingly, an aspect of the present invention improves layout freedom of a sensor for acquiring information outside a vehicle based on invisible light.

According to an aspect of the present invention, there is provided a lamp device to be mounted on a vehicle, the lamp device including:

a housing;

a first translucent member defining a housing space together with the housing;

a lamp unit housed in the housing space and including a light source;

a sensor housed in the housing space and configured to detect information outside the vehicle based on invisible light; and a second translucent member housed in the housing space and covering the sensor, wherein the second translucent member has transmittance of visible light lower than that of the first translucent member.

In the above lamp device, the sensor may include at least one of a LiDAR sensor, a millimeter wave radar, an ultrasonic sensor, and an infrared camera.

According to such a configuration, the second translucent member can function as a filter. Specifically, transmission of the light not used for detection by the sensor, particularly transmission of visible light can be suppressed. Such a filter is generally provided in the sensor itself in order to reduce influence of disturbance light to a detection result. In the above configuration, since the second translucent member disposed in the housing space can functions as such a filter, a structure for the filter function can be omitted from the sensor. That is, a size of the sensor can be reduced. Therefore, the layout freedom in the housing space of the sensor for acquiring the information outside the vehicle based on the invisible light can be improved.

Generally, an appearance of the sensor is largely different from an appearance of the lamp unit. Therefore, compared with a conventional lamp device in which only the lamp unit is housed in the housing space, a user may feel unnaturalness for the appearance. Since the second translucent member has the transmittance of visible light lower than that of the first translucent member, the second translucent member has a gray or black appearance. Accordingly, it is possible to make it difficult to visually recognize the sensor disposed in the housing space from the outside of the vehicle. Therefore, deterioration of design can be suppressed.

In the above lamp device, the second translucent member may have flexibility higher than that of the first translucent member.

According to this configuration, the second translucent member can function as a cushioning material when a strong shock along with displacement of the sensor is applied to the lamp device.

In the above lamp device, the second translucent member may have an appearance simulating the lamp unit.

According to this configuration, the second translucent member may be visually recognized as the lamp unit. Accordingly, an appearance similar to the conventional lamp device in which only the lamp unit is housed in the lamp room can be provided. Therefore, the unnatural feeling given to the user by disposing the sensor in the housing space can be further suppressed.

In the above lamp device, the second translucent member may be a part of an extension member.

According to this configuration, a part of the extension member which is originally disposed in the housing space can function as a filter for the sensor. Therefore, not only the unnatural feeling given to the user can be suppressed, but also space utilization efficiency in the housing space can be improved, by disposing the sensor in the housing space.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
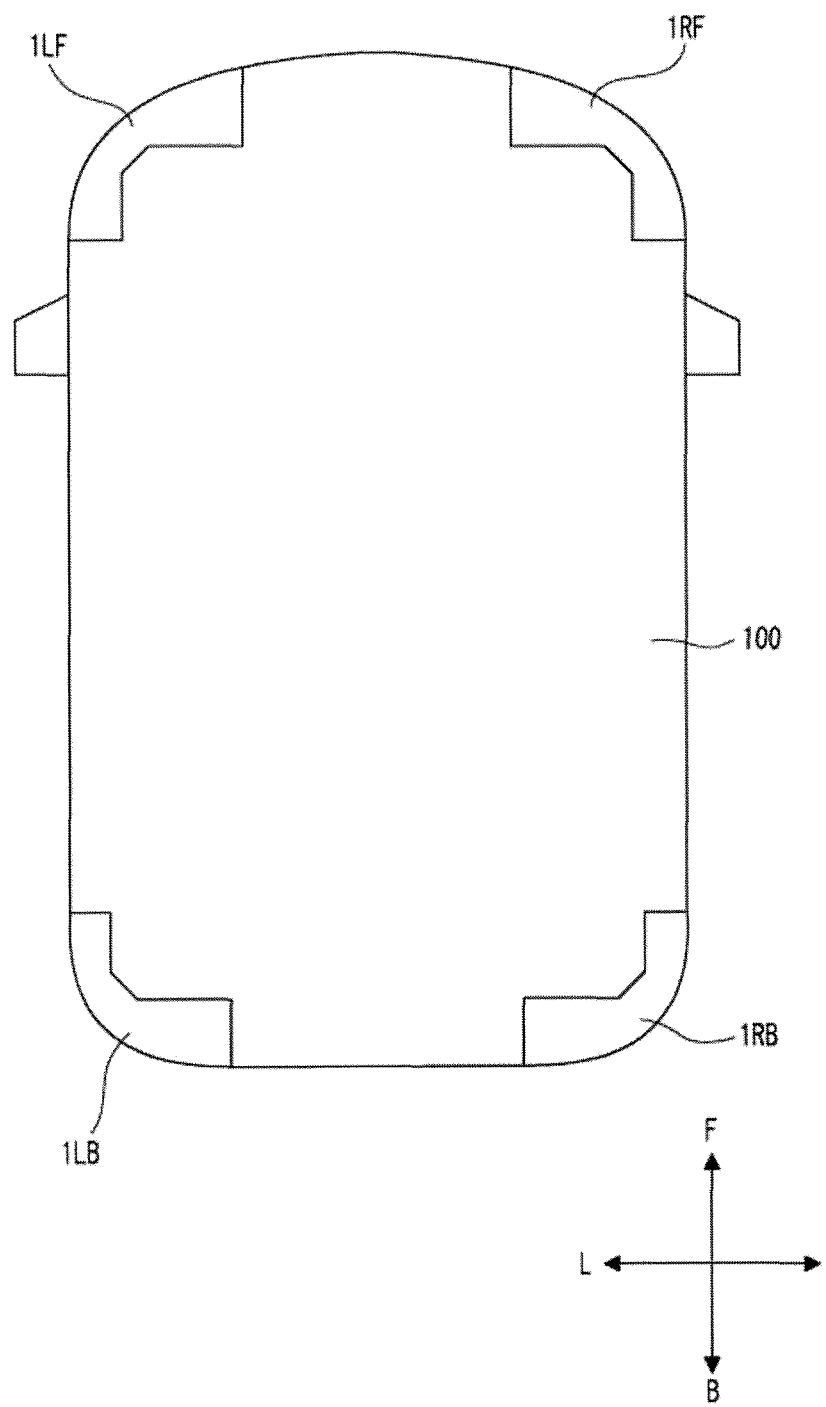
FIG. 1 is a diagram showing positions of lamp devices in a vehicle according to a first embodiment.

Embodiments will be described in detail below with reference to the drawings. In each drawing used in the following description, the scale is appropriately changed in order to make each member in a recognizable size.

In the drawings, Arrow F indicates a forward direction of the illustrated structure. Arrow B indicates a backward direction of the illustrated structure. Arrow U indicates an upward direction of the illustrated structure. Arrow D indicates a downward direction of the illustrated structure. Arrow L indicates a left direction of the illustrated structure.

Arrow R indicates a right direction of the illustrated structure. The "left" and "right" used in the following description indicate the left and right directions viewed from a driver's seat.

As shown in FIG. 1, a left-front lamp device 1LF according to a first embodiment is mounted on a left-front corner portion of a vehicle 100. A right-front lamp device 1RF according to the first embodiment is mounted on a right-front corner portion of the vehicle 100.

Figure 2:
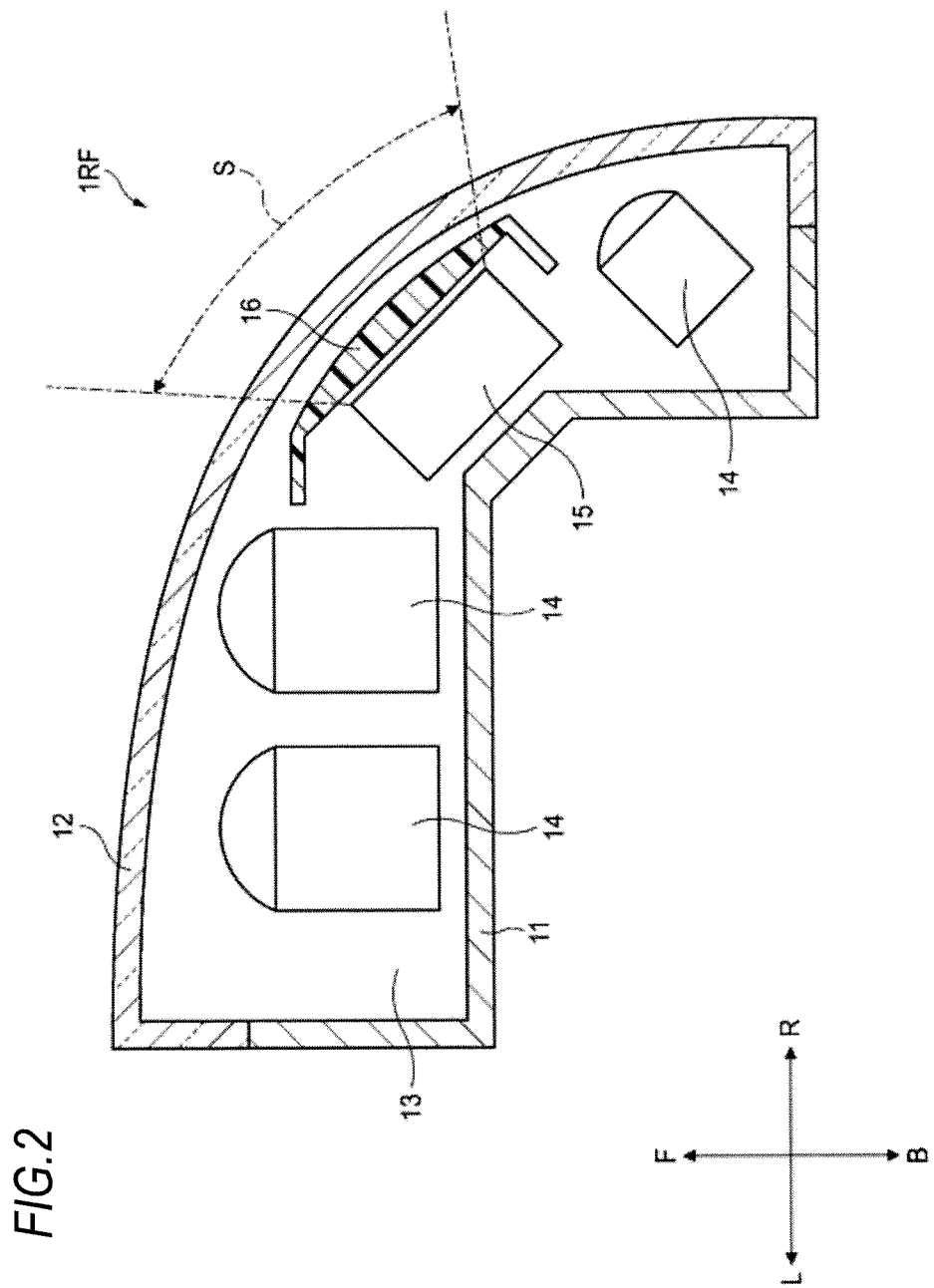
FIG. 2 is a diagram schematically showing an internal configuration of one of the lamp devices in FIG. 1.

FIG. 2 schematically shows an internal configuration of the right-front lamp device lRF viewed from a top of the vehicle 100. Although the drawing is omitted, the left-front lamp device 1LF has a configuration which is symmetrical with the right-front lamp device lRF.

The right-front lamp device 1RF includes a housing 11 and a first translucent member 12. The housing 11 and the first translucent member 12 define a lamp room 13 (an example of a housing space).

The right-front lamp device 1RF includes a lamp unit 14. The lamp unit 14 includes a light source and an optical system. The optical system includes at least one of a lens and a reflector.

Examples of the light source include a lamp light source, a semiconductor light emitting element and the like. Examples of the lamp light source include an incandescent lamp, a halogen lamp, a discharge lamp, a neon lamp and the like.

Examples of the semiconductor light emitting element include a light emitting diode, a laser diode, an organic EL element and the like. The light emitted from the light source passes through the optical system and is emitted from the lamp unit 14.

At least a part of wavelength of the light emitted from the lamp unit 14 is included in a visible light region. The light emitted from the lamp unit 14 passes through the first translucent member 12 and illuminates a predetermined region outside the vehicle 100.

The right-front lamp device 1RF includes a LiDAR sensor 15. The LiDAR sensor 15 includes an element for emitting invisible light and an element for detecting return light resulting from reflection of the invisible light to an object present outside the vehicle 100. In this embodiment, infrared light having a wavelength of 905 nm is used as the invisible light. The LiDAR sensor 15 may include a scanning mechanism for sweeping the invisible light by changing an emission direction (i.e. a detection direction).

The LiDAR sensor 15 is a sensor for acquiring information outside the vehicle 100. For example, a distance to an object associated with the return light can be acquired based on a time period between a time of emitting the infrared light in a certain direction and a time of detecting the return light. In addition, information on a shape of the object associated with the return light can be acquired by accumulating such distance data associated with detection positions. Alternatively or additionally, information on an attribute, such as a material, of the object associated with the return light can be acquired based on a difference between the emitted light and the return light. Alternatively or additionally, information on a color of the object (a white line, etc. on a road surface) can be acquired based on a difference in a reflectivity of the return light from the road surface, for example.

The right-front lamp device 1RF includes a second translucent member 16. The second translucent member 16 is disposed so as to cover at least the LiDAR sensor 15. Specifically, the second translucent member 16 is disposed so as to cover at least a detection range (a solid angle) of the LiDAR sensor 15.

The infrared light emitted from the LiDAR sensor 15 passes through the second translucent member 16 and irradiates a predetermined region outside the vehicle 100. A range S indicated by a chain line in FIG. 2 represents a range which can be irradiated (detected). Return light as a result of being reflected by the irradiated object passes through the second translucent member 16 and is detected by the LiDAR sensor 15.

The LiDAR sensor 15 outputs a signal corresponding to the detected attribute (intensity, a wavelength, or the like) of the return light. The above information is acquired by appropriately processing the signal output from the LiDAR sensor 15 by an information processing unit or a processor (not shown). The information processing unit or the processor may be included in the right-front lamp device 1RF, or may be mounted in the vehicle 100.

The transmittance of visible light in the second translucent member 16 is lower than the transmittance of visible light in the first translucent member 12. That is, the second translucent member 16 has wavelength selectivity which allows at least the wavelength of the infrared light emitted from the LiDAR sensor 15 and the wavelength of the return light to be detected by the LiDAR sensor 15 to pass therethrough.

According to such a configuration, the second translucent member 16 can function as a filter. Specifically, transmission of the light other than the infrared light used by the LiDAR sensor 15, particularly transmission of visible light can be suppressed. Herein, "suppress" means to include a case where transmission of the visible light is totally prohibited (transmittance is zero).

Generally, such a filter is provided in the sensor itself in order to reduce influence of disturbance light to a detection result. Since the second translucent member 16 disposed in the lamp room 13 can function as a filter in this embodiment, a structure for the filter function can be omitted from the LiDAR sensor 15. That is, a size of the LiDAR sensor 15 can be reduced. Therefore, the layout freedom in the lamp room 13 of the LiDAR sensor 15 for acquiring the information outside the vehicle 100 based on the invisible light can be improved.

An appearance of the LiDAR sensor 15 is, for example, a black cuboid or cubic shape, which is largely different from an appearance of the lamp unit 14. Therefore, compared with a conventional lamp device in which only the lamp unit is housed in the lamp room, a user may feel unnaturalness for the appearance. Since the second translucent member 16 has the transmittance of visible light lower than that of the first translucent member 12, the second translucent member has a gray or black appearance. Accordingly, it is possible to make it difficult to visually recognize the LiDAR sensor 15 disposed in the lamp room 13 from the outside of the vehicle 100. Therefore, deterioration of design can be suppressed.

In this embodiment, the second translucent member 16 is a part of an extension member. The extension member is a design part which covers a part of the structure disposed in the lamp room 13 so as not to be visually recognized from the outside of the vehicle 100.

According to such a configuration, a part of the extension member which is originally disposed in the lamp room 13 can function as a filter for the LiDAR sensor 15. Therefore, not only the unnatural feeling given to the user can be suppressed, but also space utilization efficiency in the lamp room 13 can be improved, by disposing the LiDAR sensor 15 in the lamp room 13.

The second translucent member 16 may have flexibility higher than that of the first translucent member 12. For example, the first translucent member 12 may be formed by, for example, polycarbonate resin. At least a part of the second translucent member 16 (a fastening portion or the like with other members) may be formed by a rubber material, silicone elastomer and the like.

According to such a configuration, the second translucent member 16 can function as a cushioning material when a strong shock along with displacement of the LiDAR sensor 15 is applied to the right-front lamp device 1RF.

Figure 3:
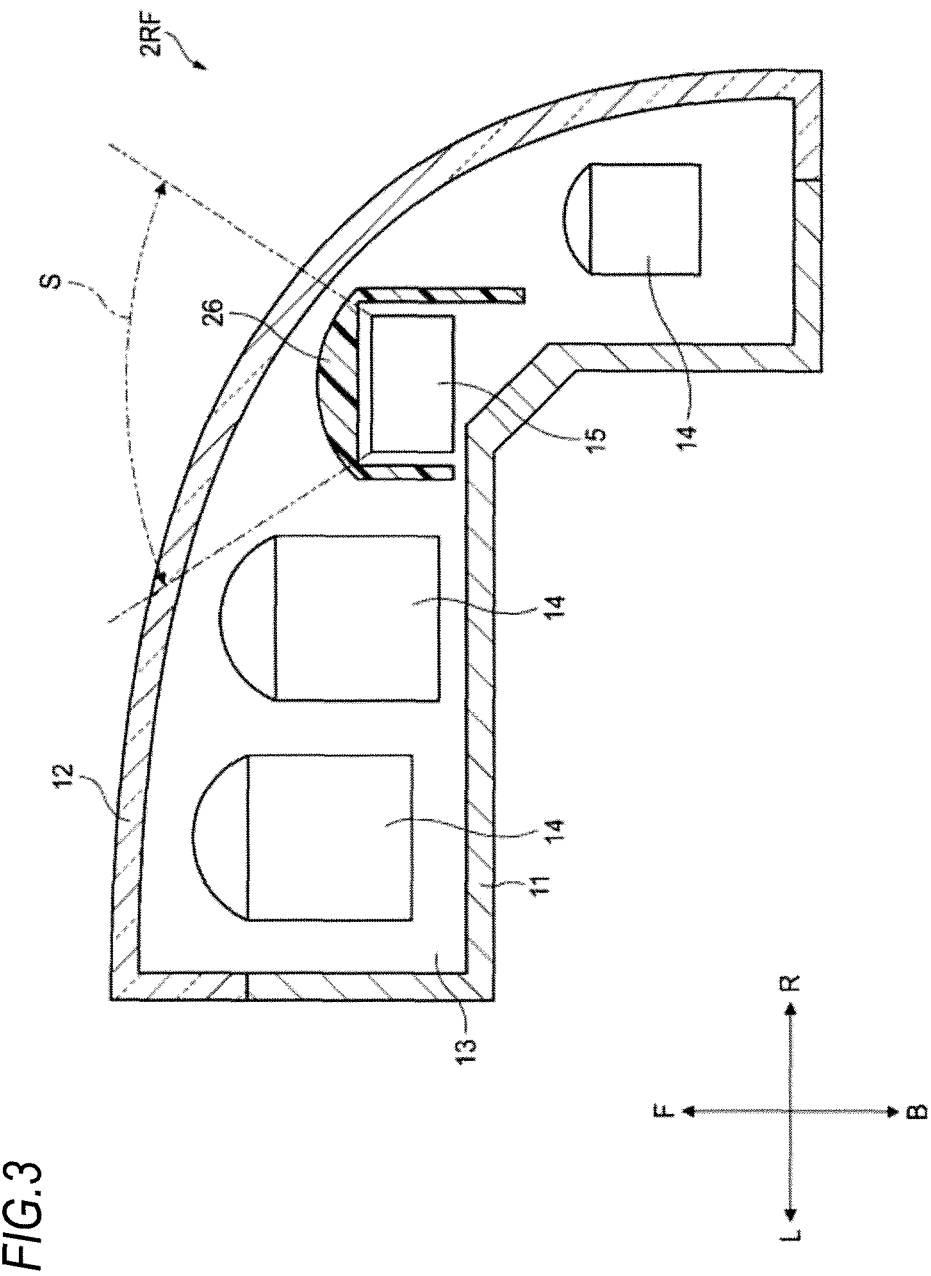
FIG. 3 is a diagram schematically showing an internal configuration of a lamp device according to a second embodiment.

FIG. 3 schematically shows an internal configuration of a right-front lamp device 2RF according to a second embodiment when viewed from the top of the vehicle 100. Constituent elements substantially common to the right-front lamp device 1RF according to the first embodiment are denoted by the same reference numerals, and repetitive explanation is omitted.

The right-front lamp device 2RF includes a second translucent member 26. The second translucent member 26 is disposed so as to cover at least the LiDAR sensor 15. Specifically, the second translucent member 26 is disposed so as to cover at least a detection range (a solid angle) of the LiDAR sensor 15.

The infrared light emitted from the LiDAR sensor 15 passes through the second translucent member 26 and irradiates a predetermined region outside the vehicle 100. A range S indicated by a chain line in FIG. 3 represents a range which can be irradiated (detected). Return light as a result of being reflected by the irradiated object passes through the second translucent member 26 and is detected by the LiDAR sensor 15.

The transmittance of visible light in the second translucent member 26 is lower than the transmittance of visible light in the first translucent member 12. That is, the second translucent member 26 has wavelength selectivity which allows at least the wavelength of the infrared light emitted from the LiDAR sensor 15 and the wavelength of the return light detected by the LiDAR sensor 15 to pass therethrough.

According to such a configuration, the second translucent member 26 can function as a filter. Specifically, transmission of the light other than the infrared light used by the LiDAR sensor 15, particularly transmission of visible light can be suppressed. Herein, "suppress" means to include a case where transmission of the visible light is totally prohibited (transmittance is zero).

Generally, such a filter is provided in the sensor itself in order to reduce influence of disturbance light to a detection result. Since the second translucent member 26 disposed in the lamp room 13 can function as a filter in this embodiment, a structure for the filter function can be omitted from the LiDAR sensor 15. That is, a size of the LiDAR sensor 15 can be reduced. Therefore, the layout freedom in the lamp room 13 of the LiDAR sensor 15 for acquiring the information outside the vehicle 100 based on the invisible light can be improved.

An appearance of the LiDAR sensor 15 is, for example, a black cuboid or cubic shape, which is largely different from an appearance of the lamp unit 14. Therefore, compared with a conventional lamp device in which only the lamp unit is housed in the lamp room, a user may feel unnaturalness for the appearance. Since the second translucent member 26 has the transmittance of visible light lower than that of the first translucent member 12, the second translucent member has a gray or black appearance. Accordingly, it is possible to make it difficult to visually recognize the LiDAR sensor 15 disposed in the lamp room 13 from the outside of the vehicle 100. Therefore, deterioration of design can be suppressed.

Figure 4A:
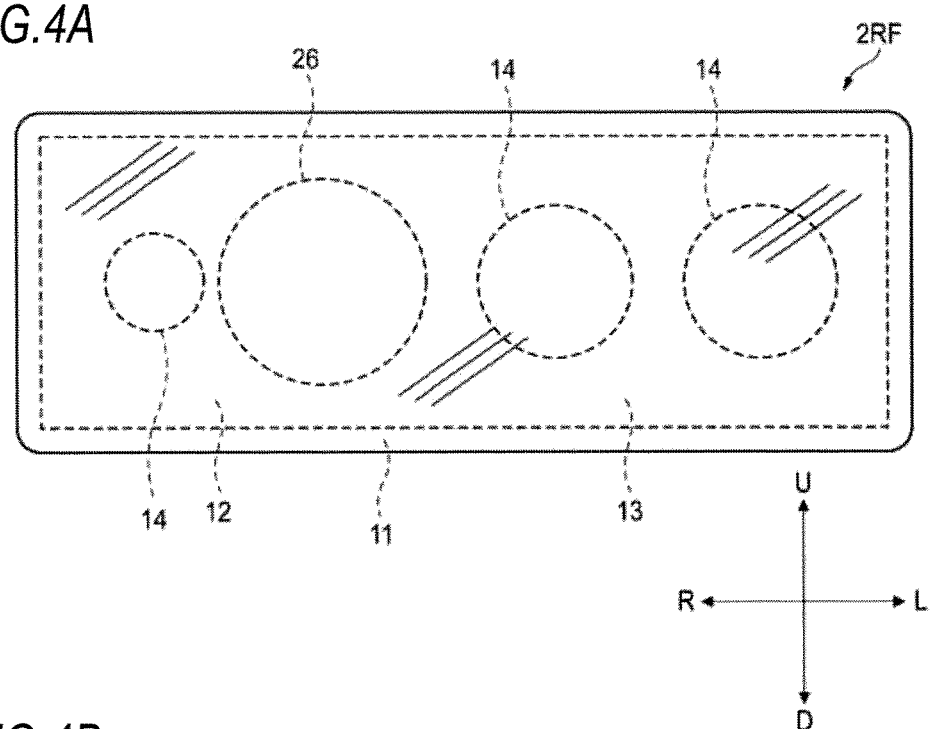
FIGS. 4A and 4B are diagrams showing an appearance of the lamp device in FIG. 3.
Figure 4B:
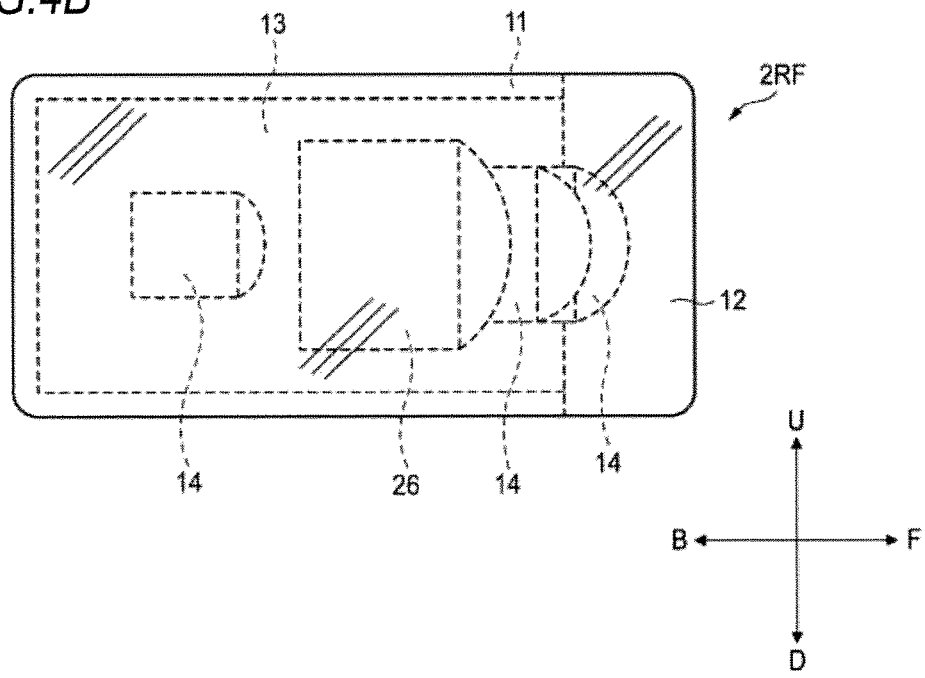

FIG. 4A shows an appearance of the right-front lamp device 2RF viewed from the front in a front-back direction of the vehicle 100. FIG. 4B shows an appearance of the right-front lamp device 2RF viewed from the right in a left-right direction of the vehicle 100.

In this embodiment, the second translucent member 26 has an appearance simulating (simulated appearance of) the lamp unit 14. The expression "simulated appearance" means that at least one of the size, shape, color, and texture is the same as or similar to the corresponding attribute of the lamp unit 14.

According to such a configuration, the second translucent member 26 may be visually recognized as the lamp unit 14. Accordingly, an appearance similar to the conventional lamp device in which only the lamp unit is housed in the lamp room can be provided. Therefore, the unnatural feeling given to the user can be further suppressed by disposing the LiDAR sensor 15 in the lamp room 13.

Similarly to the second translucent member 16 according to the first embodiment, the second translucent member 26 may be a part of the extension member.

Similarly to the second translucent member 16 according to the first embodiment, the second translucent member 26 may have flexibility higher than that of the first translucent member 12.

Each of the above embodiments is merely an example to facilitate understanding of the present invention. The configuration according to each of the embodiments can be modified or improved appropriately without departing from the spirit of the present invention. Further, it is apparent that equivalents fall within the technical scope of the present invention.

In the above embodiments, a LiDAR sensor is used as a sensor for acquiring information outside the vehicle 100. However, a sensor may be appropriately selected based on the type of information to be acquired as long as the acquisition is based on invisible light. For example, a millimeter wave radar, an ultrasonic sensor, an infrared camera and the like can be used.

In the above embodiments, a single housing space (the lamp room 13) is defined by the housing 11 and the first translucent member 12. However, the inside of the housing space can be divided into a plurality of spaces by a partition plate or the like.

In the above embodiments, the lamp device including the LiDAR sensor 15 is used as the left-front lamp device 1LF and the right-front lamp device 1RF. However, a configuration described with reference to the right-front lamp device 1RF can also be applied to a left-back lamp device 1LB disposed in a left-back corner of the vehicle 100 and a right-back lamp device 1RB disposed in a right-back corner of the vehicle 100 shown in FIG. 1. For example, the right-back lamp device 1RB may have a configuration symmetrical with the right-front lamp device 1RF (the light source is appropriately changed). The left-back lamp device 1LB may have a configuration symmetrical with the right-back lamp device 1RB.

The invention claimed is:

1. A lamp device to be mounted on a vehicle, comprising:
    a housing;
    a first translucent member defining a housing space together with the housing;
    a lamp unit housed in the housing space and including a light source;

a sensor housed in the housing space and configured to detect information outside the vehicle based on invisible light; and a second translucent member housed in the housing space and covering the sensor, wherein the second translucent member has transmittance of visible light lower than that of the first translucent member, and is formed of material having wavelength selectivity that transmits infrared light while suppressing visible light.

2. The lamp device according to claim 1, wherein the second translucent member has flexibility higher than that of the first translucent member.

3. The lamp device according to claim 1, wherein the second translucent member has an appearance simulating the lamp unit.

4. lamp device according to claim 1, wherein the second translucent member is a part of an extension member, and wherein the extension member is disposed in the housing space and covers a part of a structure disposed in the housing space so as not to be visually recognized from outside the vehicle.

5. The lamp device according to claim 1, wherein the sensor includes at least one of a LiDAR sensor, a millimeter wave radar, an ultrasonic sensor, and an infrared camera.

6. A lamp device to be mounted on a vehicle, comprising:

a housing;

a first translucent member defining a housing space together with the housing;

a lamp unit housed in the housing space and including a light source;

a sensor housed in the housing space and configured to detect information outside the vehicle based on invisible light; and a second translucent member housed in the housing space and covering the sensor, wherein the second translucent member has transmittance of visible light lower than that of the first translucent member and is formed of material having wavelength selectivity that transmits invisible light while suppressing visible light.

* * * * *